(12) United States Patent
Wang

(10) Patent No.: US 8,271,965 B2
(45) Date of Patent: *Sep. 18, 2012

(54) APPARATUS TO GUARANTEE TYPE AND INITIALIZATION SAFETY IN MULTITHREADED PROGRAMS

(75) Inventor: Zhong Liang Wang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1020 days.

This patent is subject to a terminal disclaimer.

(21) Appl. No.: 12/244,848

(22) Filed: Oct. 3, 2008

(65) Prior Publication Data

US 2009/0037891 A1 Feb. 5, 2009

Related U.S. Application Data

(63) Continuation of application No. 10/882,575, filed on Jul. 1, 2004, now Pat. No. 7,434,212.

(30) Foreign Application Priority Data

Jul. 3, 2003 (CA) ..................................... 2434280

(51) Int. Cl.
*G06F 9/45* (2006.01)
*G06F 9/44* (2006.01)

(52) U.S. Cl. ......... 717/148; 717/116; 717/140; 717/150

(58) Field of Classification Search ........................ None
See application file for complete search history.

(56) References Cited

U.S. PATENT DOCUMENTS

| | | | |
|---|---|---|---|
| 5,860,126 A | 1/1999 | Mittal | |
| 6,061,520 A | 5/2000 | Yellin et al. | |
| 6,233,725 B1 | 5/2001 | Beadle et al. | |
| 6,256,784 B1 | 7/2001 | Grove | |
| 6,292,939 B1 * | 9/2001 | Itou et al. | 717/149 |
| 6,324,687 B1 | 11/2001 | Beadle et al. | |
| 6,530,075 B1 | 3/2003 | Beadle et al. | |
| 6,665,865 B1 * | 12/2003 | Ruf | 717/157 |
| 6,691,307 B2 | 2/2004 | Long | |
| 6,799,315 B2 | 9/2004 | Waki et al. | |
| 6,857,063 B2 | 2/2005 | Moyer | |
| 6,895,579 B2 | 5/2005 | Lueh | |
| 6,904,589 B1 * | 6/2005 | Kolodner et al. | 717/116 |
| 7,065,755 B2 * | 6/2006 | Daynes et al. | 717/148 |

(Continued)

OTHER PUBLICATIONS

Zee et al., Write barrier removal by static analysis, Nov. 2002, 20 pages, <http://delivery.acm.org/10.1145/590000/582439/p191-zee.pdf>.*

(Continued)

*Primary Examiner* — Thuy Dao
(74) *Attorney, Agent, or Firm* — Patents On Demand P.A.; Brian K. Buchheit; Scott M. Garrett

(57) ABSTRACT

A method and apparatus to guarantee type safety in multithreaded programs, and to guarantee initialization safety in well-behaved multithreaded programs. A plurality of bytecodes representing a program are received and examined to identify bytecodes defining object creation operations and object initialization operations. Upon execution of the plurality of bytecodes, memory barrier operations are performed subsequent to the performance of both the object creation operations and the object initialization operations. This guarantees type safety, and further guarantees initialization safety if the program is well-behaved. Optimization algorithms may also be applied in the compilation of bytecodes to improve performance.

14 Claims, 6 Drawing Sheets

U.S. PATENT DOCUMENTS

| | | | |
|---|---|---|---|
| 7,194,735 B2 | 3/2007 | Barclay | |
| 7,225,439 B2 * | 5/2007 | Garthwaite | 717/150 |
| 7,254,809 B2 * | 8/2007 | Kurhekar et al. | 717/146 |
| 7,380,086 B2 * | 5/2008 | Archambault et al. | 711/170 |
| 7,404,182 B1 * | 7/2008 | Garthwaite et al. | 717/140 |
| 7,406,687 B1 * | 7/2008 | Daynes et al. | 717/166 |
| 7,434,212 B2 * | 10/2008 | Wang | 717/148 |
| 7,665,075 B1 * | 2/2010 | Daynes et al. | 717/148 |
| 7,673,295 B1 * | 3/2010 | Lin | 717/156 |
| 7,685,580 B1 * | 3/2010 | Detlefs et al. | 717/140 |
| 2002/0095453 A1 | 7/2002 | Steensgaard | |
| 2002/0107667 A1 * | 8/2002 | Mathiske et al. | 702/186 |
| 2002/0144240 A1 | 10/2002 | Lueh et al. | |

OTHER PUBLICATIONS

Kotzmann et al., Escape analysis in the context of dynamic compilation and deoptimization, Jun. 2005, 10 pages, <http://delivery.acm.org/10.1145/1070000/1064996/p111-kotzmann.pdf>.*

* cited by examiner

APPARATUS TO GUARANTEE TYPE AND INITIALIZATION SAFETY IN MULTITHREADED PROGRAMS

CROSS-REFERENCE TO RELATED APPLICATIONS

This application is a continuation application of and claims the benefit of U.S. patent application Ser. No. 10/882,575, filed 1 Jul. 2004, which claims priority to Canadian Patent Application No. 2,434,280, filed 3 Jul. 2003, both of which are hereby incorporated by reference.

BACKGROUND

The present invention relates to generally to data processing systems for executing multithreaded programs, and more particularly to data processing systems in which bytecodes are executed on multiprocessors that implement a weakly consistent memory model.

In traditional data processing systems, computer programs exist as platform-specific, compiled object code within computer system memory or other computer storage media. More recently, however, some data processing systems have implemented language models designed to support multiple host architectures.

For example, JAVA® is an object-oriented programming language and environment, in which data is represented as objects, and in which methods are defined to manipulate those objects. Java is a trademark of Sun Microsystems, Inc. Java is designed to support applications for many types of computer systems with different central processing units and operating system architectures. To enable a JAVA application to execute on different types of data processing systems, it is typically compiled into a system-independent format. The compiled code consists of bytecodes, which are instructions that are not specific to any particular computer architecture, and which are designed to be executed on any computer system with an appropriate run-time environment.

In some data processing systems, a JAVA virtual machine (JVM) is provided to control the execution of bytecodes. The JVM is abstract computing machines, which like a real computing machine, has an instruction set and manipulates various memory areas at run-time. The JVM does not assume any particular implementation technology, host hardware, or host operating system. The JVM recognizes a particular binary format known as the "class" file format. A class file contains the bytecodes associated with an application or program, as well as a symbol table and other ancillary information.

The JVM will typically also include a Java interpreter, which is a module that alternately decodes and executes individual bytecodes. The interpreter, however, does not examine entire programs to obtain optimizations such as those that may be provided by some traditional compilers. Even frequently executed code must be reinterpreted each time it is invoked. As a result, in performance-critical environments, just-in-time (JIT) compilers may also be employed to dynamically translate bytecodes, typically of one or more methods, into native code consisting of instructions of the machine where the code is to be executed. The JVM retains the native code associated with these methods, and next time one of these methods is invoked, the JVM executes the native code associated with the invoked method instead of relying on the interpreter to interpret the method's bytecodes one at a time.

In operation, a JVM (with its interpreter and/or JIT compiler) is expected to properly execute a Java program that is written in accordance with the Java Language Specification. It is expected that the JVM should neither crash nor produce incorrect answers when executing a correctly written Java program. Furthermore, even if a Java program is not written correctly, it is expected that the JVM will report errors appropriately and possibly abort the execution of the program, rather than enter into a state (e.g., crashed) in which it can no longer continue to respond.

In particular, as a JVM can support many threads of execution at once, certain problems can arise that affect the ability of a JVM to properly execute a program (originally written in Java or in some other programming language, for example) where the program is multithreaded. Threads independently execute code that operates on values and objects residing in a shared main memory. Threads may be supported in a data processing system by having many hardware processors, by time-slicing a single hardware processor, or by time-slicing many hardware processors, for example.

The Java programming language, for example, supports the coding of programs that, though concurrent, still exhibit deterministic behavior, by providing mechanisms for synchronizing the concurrent activity of threads. The Java memory model described in the second edition of the Java Language Specification provides rules that impose constraints on implementations of the Java programming language, and specifically on how threads may interact through memory. These rules, however, also allow for some flexibility in order to permit certain standard hardware and software techniques that might greatly improve the speed and efficiency of concurrent code. For example, an optimizing compiler may be adapted to perform certain kinds of code rearrangement intended to improve performance while preserving the semantics of properly synchronized programs.

The concurrent execution of multithreaded programs on multiprocessor systems may result in some unique problems. Many shared memory multiprocessors in current data processing systems implement a weakly consistent memory model, rather than a strongly consistent model (e.g., sequential consistency) that imposes strict constraints on the order in which operations on memory are to be performed. In implementations of a weakly consistent memory model, higher performance can generally be achieved. However, weakly consistent memory models can also produce surprising results when multithreaded programs are not properly synchronized.

These results can be particularly severe in object-oriented languages and in languages (e.g., Java) that make safety guarantees. In particular, with respect to object-oriented programs, the severity of certain results may be attributed to the fact that a number of "hidden" data structures are usually manipulated by the runtime system (e.g., the virtual function table). On a multiprocessor system in which a weakly consistent memory model is implemented, multithreaded programs may give rise to issues with an object's type safety concerned with "hidden" data, for example.

In one instance, type safety would be violated if a processor attempts to read a value in an object's field representing an object's type that is supposed to contain a valid reference or pointer, but sees a garbage value instead. Accordingly, such violations of type safety could result in a crash of the virtual machine executing the program. This could arise in situations where the value corresponding to the reference is to be stored as "hidden" data associated with the object, but where an attempt to read that value is made before the value is actually stored. Unfortunately, such a sequence of events could occur in certain executions of a multithreaded program on a multiprocessor system in which a weakly consistent memory model is implemented.

Furthermore, on a multiprocessor system in which a weakly consistent memory model is implemented, multithreaded programs may also give rise to issues with an object's initialization safety. With respect to object-oriented programs, if an object is not made visible outside of a constructor until after the constructor terminates, then no code (including unsynchronized code in another thread) should be able to see that object until all of the effects of the constructor for that object can be seen, in order to maintain initialization safety. Unfortunately, premature attempts to see that object could occur in certain executions of a multithreaded program on a multiprocessor system in which a weakly consistent memory model is implemented. While violations of initialization safety may not always result in a crash of the virtual machine executing the program, incorrect computations may be obtained. This may occur despite the fact that the program would be considered "correct" in the sense that the program conforms to the standard specification of the language in which it was written.

BRIEF SUMMARY

In one broad aspect of the present invention, there is provided a method of executing bytecodes in a data processing system comprising the steps of: receiving a plurality of bytecodes, each bytecode defining an operation, wherein the plurality of bytecodes comprises at least first and second subsets of bytecodes, and wherein each bytecode belonging to the first and second subsets defines an object creation operation and an object initialization operation respectively; identifying bytecodes belonging to at least one of the first and second subsets in the plurality of bytecodes; and executing the plurality of bytecodes, wherein the operation defined by each bytecode is performed, and so that when the operation defined by at least one bytecode belonging to the first subset is performed, a memory barrier operation is performed thereafter, and when the operation defined by at least one bytecode belonging to the second subset is performed, a memory barrier operation is performed thereafter.

The insertion of memory barrier operations in the instructions of a multithreaded program to be performed in accordance with the present invention guarantees type safety of programs. For well-behaved programs, initialization safety is also guaranteed.

In another broad aspect of the present invention, there is also provided a method and apparatus for optimizing performance of the execution of well-behaved programs while maintaining type and initialization safety.

BRIEF DESCRIPTION OF THE SEVERAL VIEWS OF THE DRAWINGS

For a better understanding of the present invention, and to show more clearly how it may be carried into effect, reference will now be made, by way of example, to the accompanying drawings used to describe preferred embodiments of the invention, wherein.

DETAILED DESCRIPTION OF THE INVENTION

Figure 1:
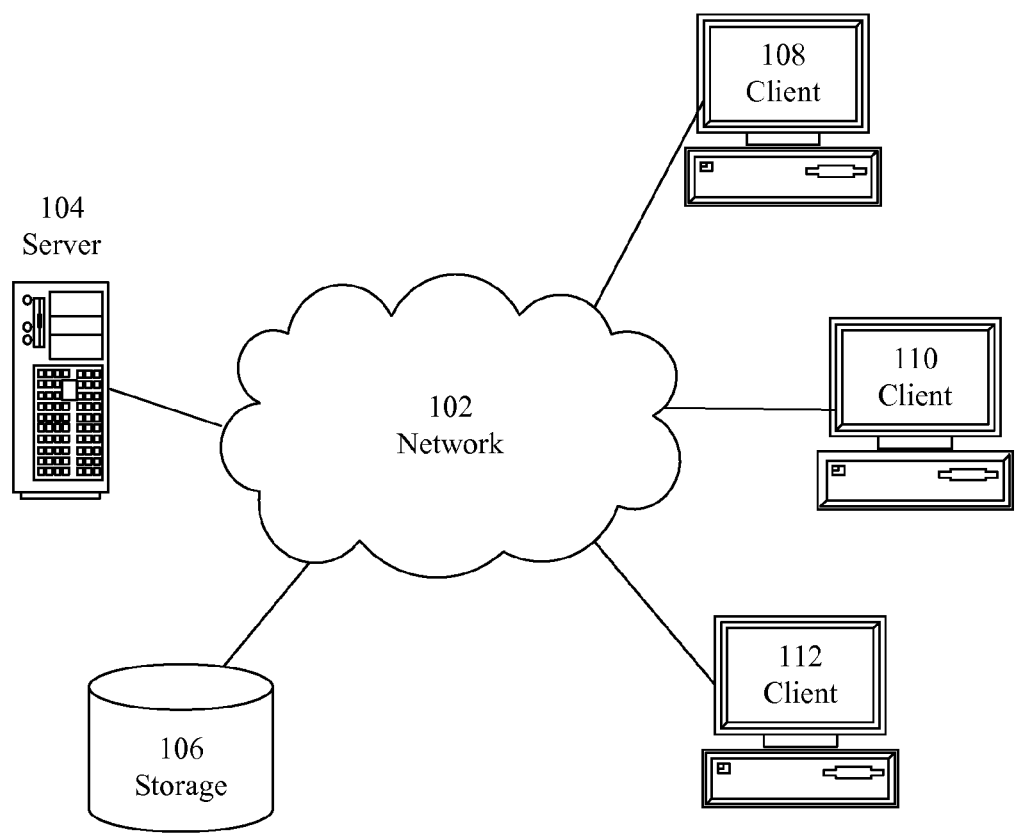
FIG. 1 is a schematic diagram illustrating an example network of data processing systems in which an embodiment of the present invention may be implemented.

Referring to FIG. 1, a schematic diagram illustrating an example network of data processing systems in which an embodiment of the present invention may be implemented is shown. Network data processing system 100 contains a network 102, which is the medium used to provide communications links between various devices and computers connected together within network data processing system 100. Network 102 may include connections known in the art, such as wire, wireless communications links, and/or fiber optic cables, for example. In the example shown, a server 104 and a storage unit 106 is connected to network 102. Client computing devices 108, 110, and 112 are also connected to network 102. It will be understood by persons skilled in the art that the specific configuration and composition of network data processing system 100 as shown in FIG. 1 is provided by way of example only, and is not intended to limit the scope of the present invention.

Figure 2:
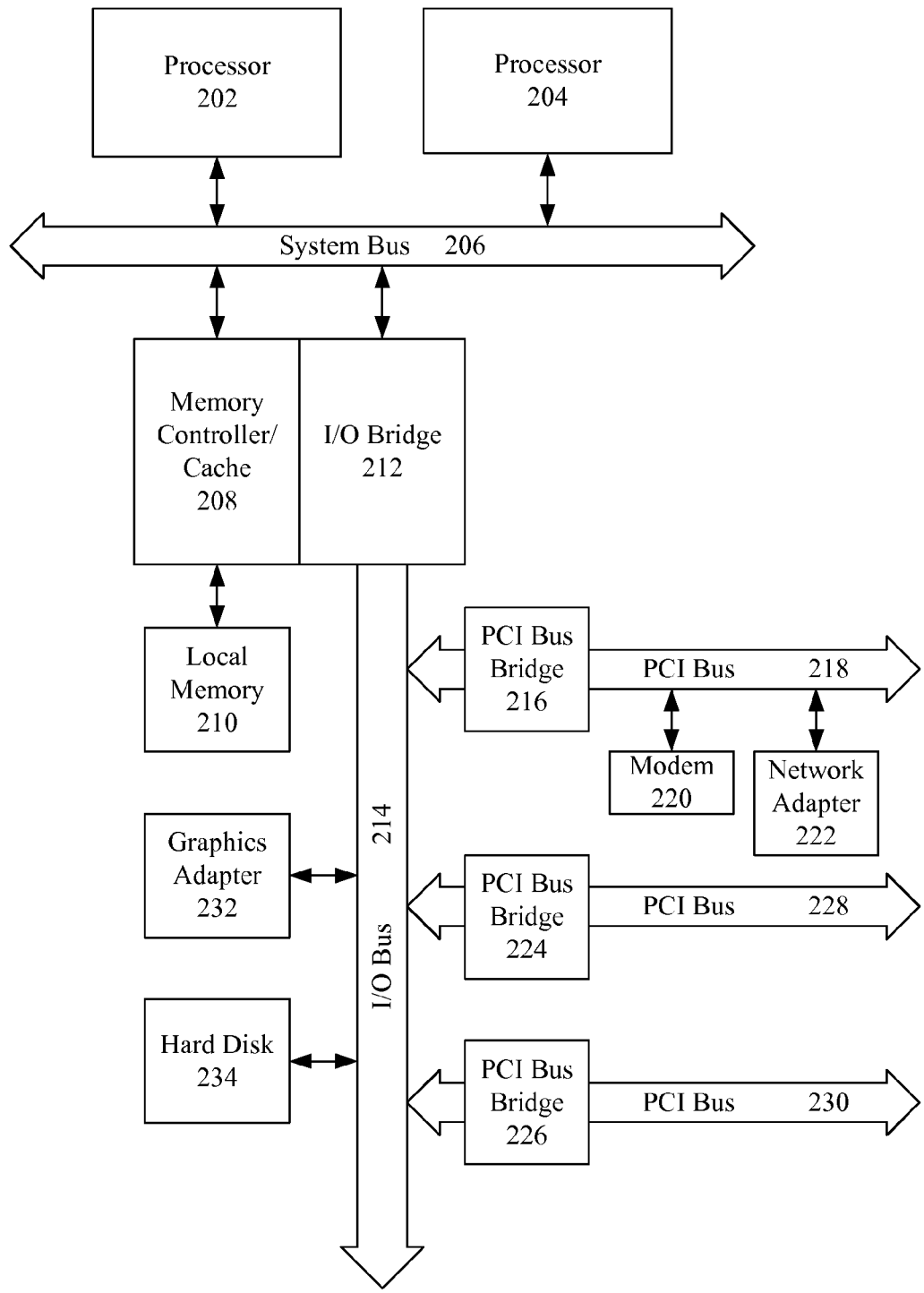
FIG. 2 is a schematic diagram illustrating the components of an example server in which an embodiment of the present invention may be implemented.

Referring to FIG. 2, a schematic diagram illustrating the components of an example server in which an embodiment of the present invention may be implemented is shown. In this embodiment, data processing system 200 is implemented as a server, such as server 104 as shown in FIG. 1, although in variant embodiments of the invention, the present invention may be implemented in a client computing device. Data processing system 200 is a symmetric multiprocessor system (SMP) including a plurality of processors 202 and 204 connected to system bus 206. Data processing system 200 may be, for example, an International Business Machines Corporation pSeries server.

Also connected to system bus 206 is a memory controller/cache 208, which provides an interface to local memory 210. I/O bus bridge 212 is connected to system bus 206 and provides an interface to I/O bus 214. Memory controller/cache 208 and I/O bus bridge 212 may be integrated as shown in FIG. 2. Peripheral component interconnect (PCI) bus bridge 216 connected to I/O bus 214 provides an interface to PCI local bus 218. A number of modems may be connected to PCI local bus 218. Typical PCI bus implementations will support multiple PCT expansion slots or add-in connectors. Communication links to clients (e.g., client computing devices 108, 110, and 112 of FIG. 1) may be provided through a modem 220 and/or a network adapter 222 connected to PCI local bus 218 through add-in boards. Additional PCI bus bridges 224 and 226 provide interfaces for additional PCI local buses 228 and 230, from which additional modems or network adapters may be supported. In this manner, data processing system 200 allows connections to multiple network computers. A memory-mapped graphics adapter 232 and hard disk 234 may also be directly or indirectly connected to I/O bus bridge 212.

An operating system (e.g., Advanced Interactive Executive (AIX)) runs on data processing system 200 to coordinate and provide control of various components therein. An object oriented programming system such as Java may run in conjunction with the operating system, and provides calls to the operating system from Java programs or applications executing on data processing system 200. Instructions for the operating system, the object-oriented programming system, and applications or programs are located on storage devices, such as hard disk 234, and may be loaded into local memory 210 for execution by processors 202, 204.

It will be understood by persons skilled in the art that the specific configuration and composition of data processing system 200 as shown in FIG. 2 is provided by way of example only, and is not intended to limit the scope of the present invention.

Figure 3:
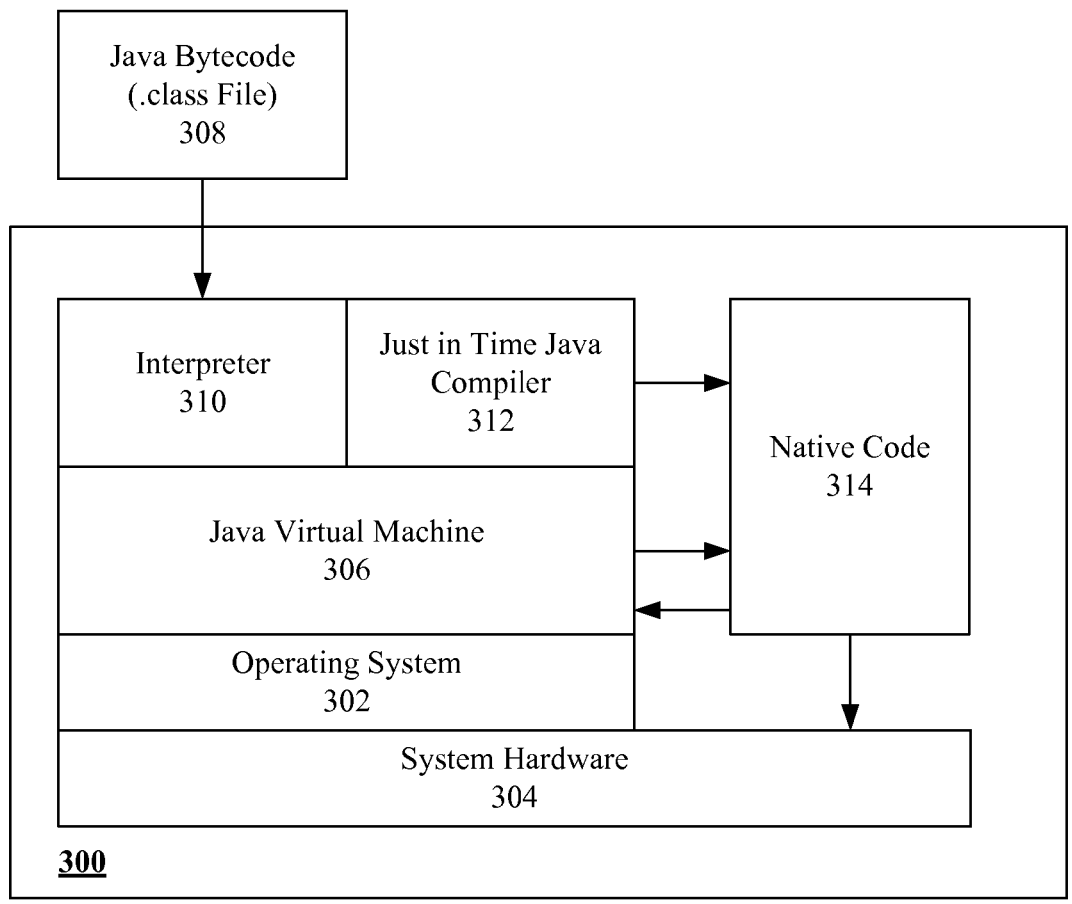
FIG. 3 is a schematic diagram illustrating the components of an example data processing system in which a Java virtual machine resides and in which an embodiment of the present invention may be implemented.

Referring to FIG. 3, a schematic diagram illustrating the components of an example data processing system in which a Java virtual machine resides and in which an embodiment of the present invention may be implemented, is shown generally as 300. In this embodiment, system 300 is a multiprocessor data processing system, such as data processing system 200 as shown in FIG. 2. System 300 includes multiple processors [not shown], and an operating system 302 allocating access to system hardware resources 304, and a Java virtual machine (JVM) implementation 306 capable of executing Java programs in bytecode format stored in a Java bytecode class file 308. JVM 306 running on system 300 relies on services and hardware resources 304 such as registers and memory. JVM 306 may utilize memory to store, for example, Java stacks, a heap, and a method area to execute Java programs. JVM 306 may utilize a Java interpreter 310 to interpret bytecodes in a received Java bytecode class file 308. JVM 306 may also utilize a Java just-in-time (JIT) compiler 312 to generate executable native code 314 from a received Java bytecode class file 308. In operation, JIT compiler 312 is typically used to dynamically compile a number of methods that JVM 306 expects to invoke multiple times in order to improve the overall performance of system 300 in the execution of Java programs. However, multiple methods, classes, and entire programs may be compiled in variant implementations of system 300 in which a JIT compiler 312 is used.

Figure 4:
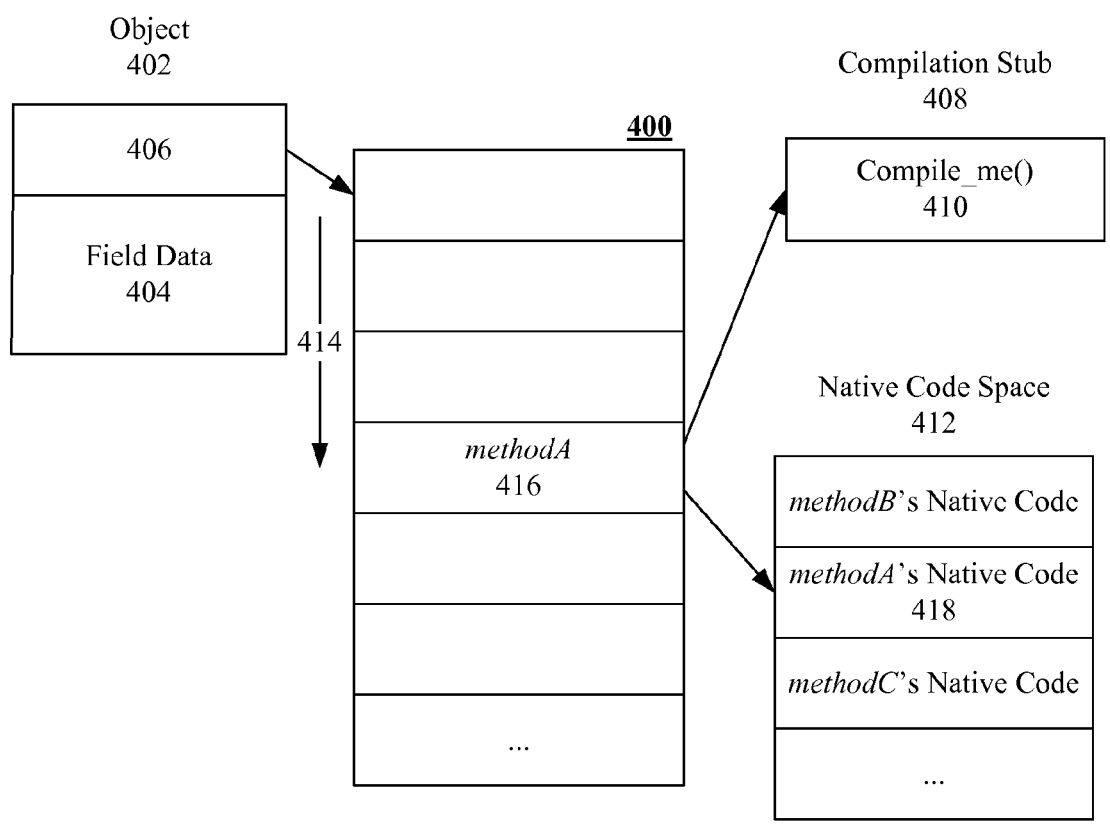
FIG. 4 is a schematic diagram illustrating an example flow of operations performed in a conventional Java object method invocation.

Referring to FIG. 4, a schematic diagram illustrating an example flow of operations performed in a conventional Java object method invocation is shown. In an example conventional Java system in which a JIT compiler is used, such as system 300 as shown in FIG. 3, tables 400 (e.g., virtual function tables) are created by the Java virtual machine (e.g., JVM 306 of FIG. 3). An object 402 may contain data 404 associated with a number of fields, and object 402 is an instance of a class that defines an implementation for that particular type of object. For each defined class, a table 400 is created containing an entry for each method of the class, and a field 406 of each object of the class contains a reference (i.e., pointer) to the table 400 associated with the class. In addition to field 406 containing a pointer to table 400, object 402 will also contain other "hidden" fields that are intended for the JVM's "internal" use (i.e., used to assist in its own operations), but are not made accessible to programmers. For example, the type of object 402 may be identified by way of a reference to a class object, where the reference is stored in a field of object 402 as "hidden" data. In another example implementation, object 402 may reference table 400 indirectly, through its class object reference, which is stored as "hidden" data.

Each table 400 is initially set to reference a compilation stub 408 when the table 400 is created by the JVM. When a method is invoked by the JVM and just-in-time compilation is desired, a compilation routine 410 within compilation stub 408 is executed, which in turn invokes the JIT compiler (e.g., JIT compiler 312 of FIG. 3) to compile the invoked method's bytecodes into executable native code. The native code is stored within a native code space 412, in memory under control of the JVM. The entry in table 400 corresponding to the invoked method is then updated to reference the corresponding compiled native code stored within native code space 412. By resolving this symbolic compilation stub 408 reference to a direct reference to executable native code stored in native code space 412, dynamic, just-in-time compilation can provide faster method execution times for previously invoked methods and, consequently, faster overall program execution for many Java programs as compared to bytecode interpretation.

For example, to invoke methodA, the reference in field 406 of an object 402 and an offset 414 of the corresponding entry 416 for methodA within method table 400 are used to resolve the location of the desired method's native code 418 stored in native code space 412.

Figure 5:
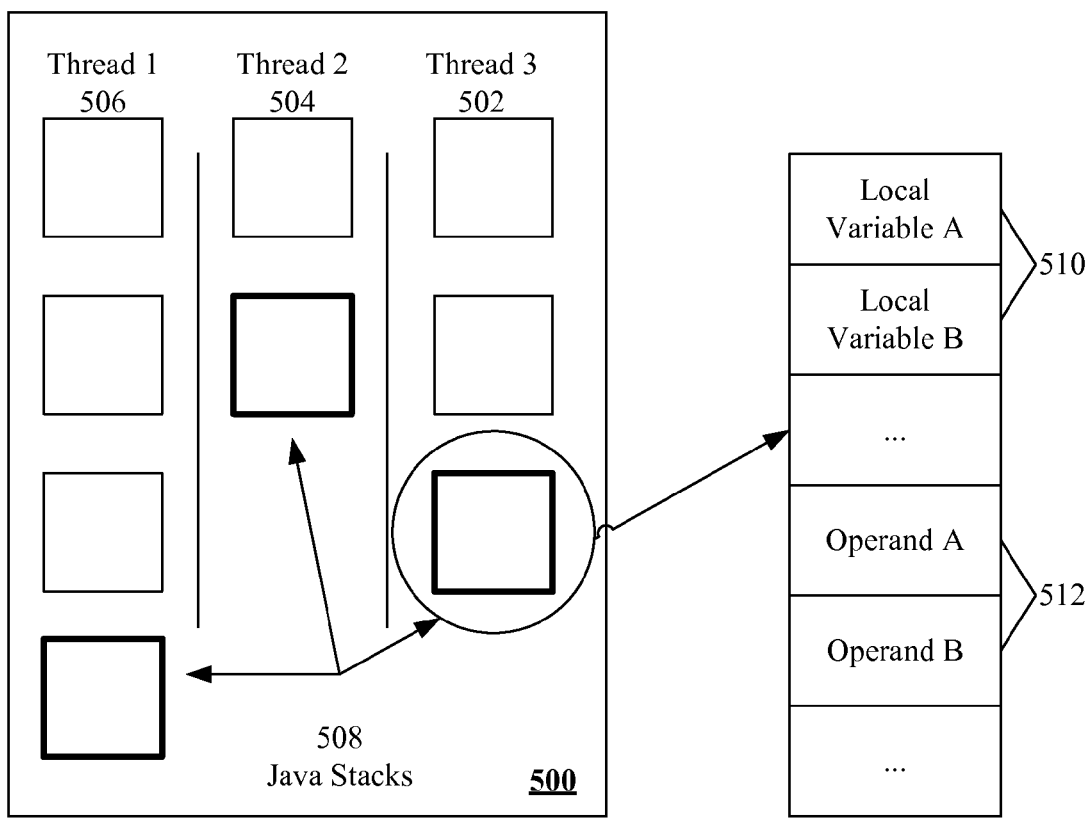
FIG. 5 is a schematic diagram illustrating an example of the run-time environment data area of a conventional Java virtual machine.

Referring to FIG. 5, a schematic diagram illustrating an example of the run-time environment data area of a conventional Java virtual machine is shown generally as 500. The JVM (e.g., JVM 306 as shown in FIG. 3) can support the simultaneous operation of multiple program contexts or "threads", and as each thread begins, a Java stack 502, 504 or 506 is created and associated with it by the JVM. Each Java stack 502, 504, 506 is composed of one or more stack frames each containing the state of one Java method invocation. An example flow of operations associated with a Java method invocation was described with reference to FIG. 4. The state of a particular Java method invocation includes its local variables, the parameters with which it was invoked, its return value (if any), as well as intermediate calculations.

The example depicted in FIG. 5 shows a JVM run-time environment in which three threads are executing, each with its own associated Java stack 502, 504, 506. It will be understood by persons skilled in the art that greater or fewer threads may exist in any given JVM implementation or instance. The method that is currently being executed by each thread is that thread's current method and the stack frame for the current method is the current frame 508. When a thread invokes a Java method, the JVM creates and pushes a new frame onto the thread's Java stack. This new frame then becomes the current frame 508. When a method completes, whether normally or abruptly, the JVM pops and discards the current frame 508, and the frame for a previous method becomes the new current frame 508. Each stack frame may be used to store parameters and local variables 510, operands 512, intermediate computations [not shown], and other data [not shown] such as data identifying the frame's associated method, the invoking method's frame, stack pointers, and program counters. The JVM has no registers to hold values associated with intermediate computations and such other data, but rather uses the stacks described above to store such values. This approach is used to keep the instruction set of the JVM compact and to facilitate implementation on system architectures with few or irregular general purpose registers.

Many shared memory multiprocessors in current data processing systems implement a weakly consistent memory model in order to improve performance. However, when multithreaded programs are not properly synchronized, surprising and potentially severe results may be produced. This is particularly problematic with languages such as Java, which makes safety guarantees. In object-oriented programs such as Java, the problems can be exceptionally severe when issues with an object's type safety concerned with "hidden" data arise.

Consider, for example, the following segment of Java code:

```
class Foo {
    int     a;
    static  Foo     oneObject;
    Foo( )
    {
        a = 55;
    }
    static void thrd1( )
    {
        oneObject = new Foo( );
    }
    static void thrd2( )
    {
        if (oneObject!=null)
        {
            oneObject.vfunc1 (....);
        }
    }
    // definition of Foo's virtual functions are not described here
in this example
}
```

In this example, when thrd1 is invoked, the following steps will typically be performed by a processor under the control of a JVM:

(1a) a portion of memory to create an object to be stored in variable oneObject is allocated from the Java heap;

(1b) "hidden" data pertaining to the object is stored (e.g., data that is used by the JVM to identify the type of the object);

(1c) the appropriate constructor of class Foo is called to initialize the object; and (1d) the newly created object is stored into the variable oneObject.

From the perspective of the Java programmer, steps (1a) through (1c) are collectively directed towards the creation of an object, coded using the Java command new. However, at the bytecode level, the task of creating an object can be represented as two discrete operations: an object creation operation identified by the bytecode new, and an object initialization operation identified by the bytecode invokespecial. Accordingly, steps (1a) and (1b) together relate to the object creation operation, while step (1c) relates to the object initialization operation.

Furthermore, in this example, when thrd2 is invoked, the following steps will typically be performed:

(2a) variable oneObject is tested and the condition is evaluated; and (2b) the virtual function vfunc1 is called if oneObject is not null.

Referring to this example, suppose that one Java thread is executing thrd1 while another Java thread is executing thrd2. On a multiprocessor system in which a weakly consistent memory model is implemented, the steps performed when thrd1 and/or thrd2 may be invoked might be performed out of order. Accordingly, there is a possibility that thrd2 will see oneObject as being non-null at step (2a), but before the object creation operation is fully completed by thrd1, and more specifically before the "hidden" data for the created object is stored at step (1b).

Put another way, although thrd1 executes a store action into variable oneObject (e.g., at (1d)) programmatically after a store action is executed in respect of the "hidden" data (e.g., at (1b)), a processor may re-order the associated store actions in such a way that thrd2 sees the latter store action first. As a result, thrd2 may pick up whatever may be in the "hidden" data area on the Java heap. This may cause the JVM to crash during dispatching calls to the virtual function vfunc1 that are based on garbage data retrieved from the "hidden" area. This is an example of a violation of type safety.

Moreover, in this example, thrd1 also calls class Foo's appropriate constructor to initialize the newly created object programmatically before the object is stored in oneObject. In the example code shown, the value 55 will be stored into instance variable a. The Java language specification requires (i.e., guarantees) that, when an object is "published" (i.e., such that another thread may become aware of its existence by reading instance or static variables for example) after its constructor returns, no further examination of the object should return a value which is not provided by either the constructor or an assignment thereafter.

However, on a multiprocessor system in which a weakly consistent memory model is implemented, the store actions executed by thrd1 may be re-ordered, and there is a possibility that thrd2 may not see instance variable a contain the initialization value of 55 when it picks up oneObject. As a result, thrd2 may not pick up the proper value, and the above-mentioned requirement of the Java language specification will not be met. This is an example of a violation of initialization safety.

The present invention relates generally to a technique for guaranteeing type safety in multithreaded programs. Moreover, application of this technique is also used to guarantee initialization safety of multithreaded programs, where the programs are "well-behaved". A well-behaved Java program is one that, in the absence of sufficient interlocking protection, does not publish newly created objects within its constructor calls. A program that is not well-behaved publishes objects too early within a constructor call, and may produce undefined results.

In one embodiment of the present invention, bytecodes received by a JVM during loading are modified such that when the bytecodes are executed, a memory barrier operation will be performed subsequent to each object creation operation and object initialization operation, to guarantee type safety. This will also guarantee initialization safety if the program represented by the bytecodes is well-behaved. In variant embodiments of the present invention, one or more optimization algorithms may also be applied to reduce the number of memory barrier operations ultimately performed when the bytecodes are executed, to enhance performance while maintaining the same level of type and initialization safety.

Figure 6:
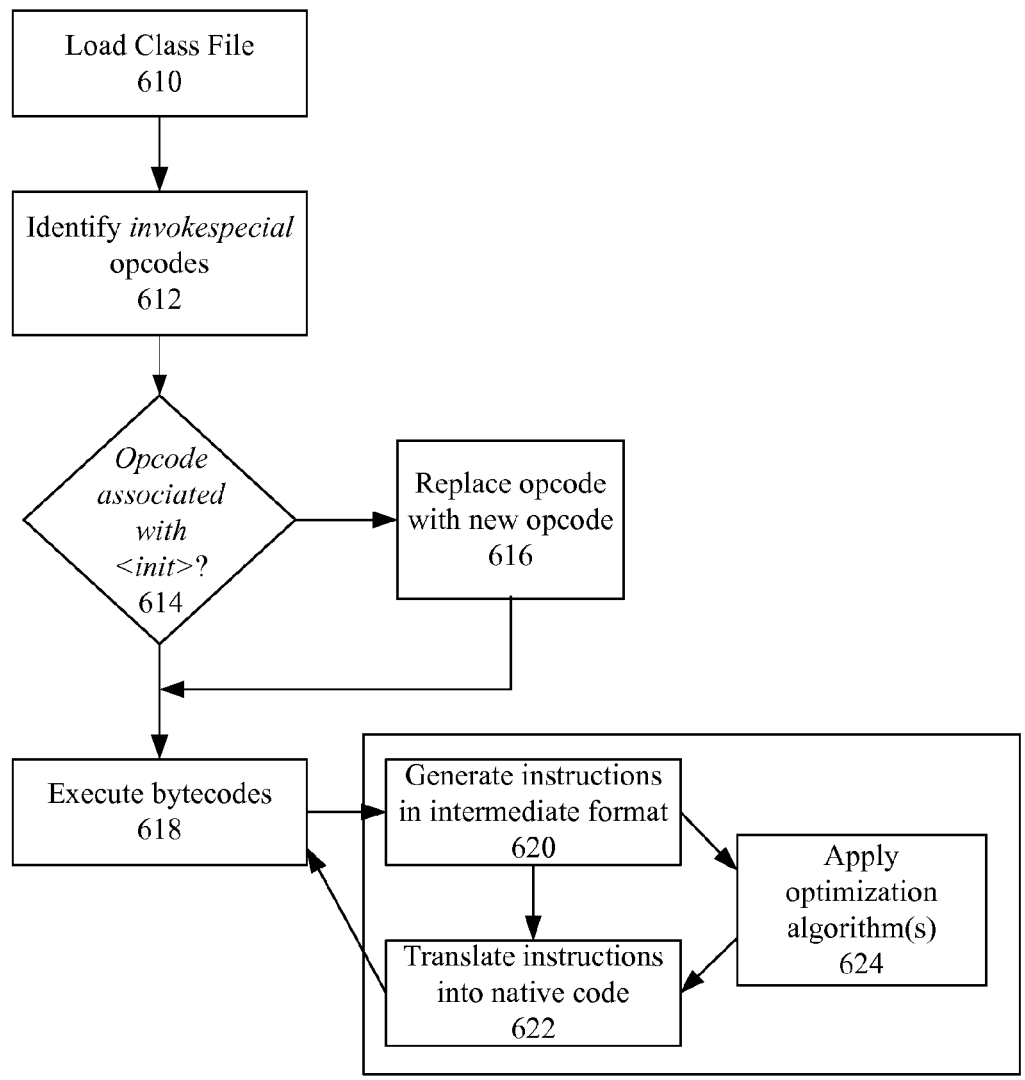
FIG. 6 is a flowchart illustrating a method of executing bytecodes in a data processing system in an embodiment of the present invention.

Referring to FIG. 6, a flowchart illustrating a method of executing bytecodes in a data processing system in an embodiment of the present invention is shown generally as 600.

At step 610, bytecodes are received by a JVM (e.g., JVM 306 of FIG. 3) by loading a class file containing a stream of bytecodes (e.g., Java bytecode class file 308 of FIG. 3).

At step 612, the JVM will scan the stream of bytecodes for instances of the invokespecial opcode and identify them.

At the level of the JVM, every constructor appears as an instance initialization method that has the special name <init>, a name supplied by a Java compiler. Currently, object or instance initialization methods may be invoked only within the Java virtual machine by the invokespecial opcode or instruction, and they may be invoked only on initialized class instances. Furthermore, a class or interface has at most one class or interface initialization method, and is initialized by invoking that method. The initialization method of a class or interface has the special name <clinit> as supplied by a Java compiler, is static and takes no arguments. However, class and interface initialization methods are invoked implicitly by the JVM; they are never invoked directly from any JVM instructions, but only indirectly as part of the class initialization process. Moreover, the invokespecial opcode is associated with not only object initialization operations, but may also be associated with other operations (e.g., a "private" method invocation operation).

Accordingly, at step 612, in order to determine if a given instance of the invokespecial opcode is associated with an object initialization operation, the JVM will also check if the opcode is associated with an initialization method named <init>.

At step 614, the JVM checks if the invokespecial opcode identified at step 612 is associated with a method named <init>. If so, the flow of method steps proceeds to step 616, at which the invokespecial opcode is replaced with a new invokespecial_and_flush opcode, while leaving the stream of bytecodes received at step 610 otherwise unchanged. If not, the flow of method steps proceeds to step 618.

At step 618, the bytecodes received at step 610 are executed. The bytecodes are executed by the processor under the control of the JVM equipped with a Java interpreter (e.g., interpreter 310 of FIG. 3). In this embodiment of the invention, the interpreter is adapted to interpret bytecodes containing the new invokespecial and flush opcode. For the interpreter, the semantic of this modified bytecode is that of invokespecial, and a memory barrier operation or store barrier to be performed thereafter (i.e., to be performed before the new object is published). A store barrier is an instruction that can be executed as a means to force the serialization of actions (e.g., by ensuring that all programmatically preceding store actions are fully completed before other store actions are initiated), and is typically platform-dependent (e.g., the lwsync instruction on International Business Machines Corporation's Power4 chips).

Furthermore, at step 618, the interpreter is also adapted to identify and interpret bytecodes containing the opcodes new, newarray, anewarray, and multianewarray, which are opcodes that are associated with an object creation operation, in accordance with this embodiment of the invention. For the interpreter, each of these bytecodes carries its original semantic, and a memory barrier operation or store barrier to be performed thereafter (i.e., to be performed before the new object is published).

The performance of the memory barrier operations during the execution of the bytecodes after the performance of an object creation operation (e.g., after step (1b) in the example code of class Foo is performed) will guarantee the type safety of objects, while the performance of the memory barrier operations during the execution of the bytecodes after the performance of an object initialization operation (e.g., after step (1c) in the example code of class Foo is performed) will guarantee the initialization safety of objects in well-behaved programs.

In some data processing systems (e.g., system 300 of FIG. 3), some or all of the bytecodes executed at step 618 may be executed under the control of the JVM after compilation into native code by a just-in-time (JIT) compiler (e.g., JIT compiler 312 of FIG. 3), as described with reference to steps 620 to 624.

Referring to step 620, in compiling bytecodes, the JIT compiler generates instructions in an intermediate format from the bytecodes received thereby. For the JIT compiler, each bytecode containing the new invokespecial_and_flush opcode is represented as two portions in this intermediate format: an invokespecial portion and a "flush" point portion. The flush point has the semantic of a store barrier. The JIT compiler may be adapted to act platform-dependently to this flush point: for computing platforms (e.g., Intel Corporation's IA-32 architecture) where store actions are guaranteed to be performed in program order, the compiler can ignore it when generating compiled code (i.e., the modified bytecode will have the same meaning as the original invokespecial bytecode), whereas in systems where store actions may be re-ordered, the store barrier is typically specific to the platform.

At step 620, the JIT compiler is also adapted to identify and interpret bytecodes containing the opcodes new, newarray, anewarray, and multianewarray, which are opcodes that are associated with an object creation operation, in accordance with this embodiment of the invention. For the JIT compiler, each of these bytecodes is represented as two portions in the intermediate format: a portion representing its original semantic, and a "flush" point. The flush point has the semantic of a store barrier.

Subsequently, at step 622, the compilation is completed as the instructions in the intermediate format are translated into native code (e.g., native code 314 of FIG. 3) for subsequent execution.

Referring to step 624, while the JIT compiler may generate compiled native code incorporating all the inserted "flush" points (inserted to guarantee type safety, and to guarantee initialization safety of well-behaved programs), the JIT compiler may be further adapted to apply, before the instructions in the intermediate format are translated into native code at step 622, optionally, one or more optimization algorithms to improve performance during execution of bytecodes (which may include JIT-compiled native code), while maintaining the same level of type and initialization safety. The optimization algorithms serve to determine scenarios in which inserted flush points initially added at step 620 may be safely eliminated before just-in-time compilation of the instructions into native code.

In this embodiment of the present invention, a basic optimization technique known as "escape analysis" is used. Typically, when an optimizer performs an escape analysis on a particular section of code, it identifies the data, if any, that does not escape the executing thread. However, in this embodiment, an optimizer (e.g., the JIT compiler) need only determine whether a given newly created object escapes the executing thread on a given section of code, represented in the intermediate format. In applying this modified form of escape analysis, certain optimization opportunities can arise in the context of the present invention, as illustrated below. The examples provided are used for illustration purposes, and are not intended to limit the scope of the present invention.

EXAMPLE 1

| a. Java statement => | b. compiled into .class file => | c. .class loaded by JVM | d. after optimization |
|---|---|---|---|
| oneObject = new Foo( ); | temp = new Foo;<br>Foo.<init>(temp);<br>oneObject = temp; | temp = new Foo;<br>flush;<br>Foo.<init>(temp);<br>flush;<br>oneObject = temp; | temp = new Foo;<br>Foo.<init>(temp);<br>flush;<br>oneObject = temp; |

In example 1, the statement shown in column (a), after compilation by a Java compiler into a class file, may appear to a JVM as shown in column (b). When loaded by a JVM adapted to add flush points in accordance with the present invention, the code appearing to the JIT compiler may be as shown in column (c). At the optimizing step 624, the escape analysis performed by the JIT compiler results in a determination that the newly created object (temp) does not escape from the Foo.<init> call for well-behaved programs. This indicates that the newly created object is not visible to any other threads until the object initialization operation (i.e., the Foo.<init> call) is completed. Accordingly, the JIT compiler can eliminate the flush point associated with the object creation operation (i.e., the new Foo call), while leaving the flush point associated with the object initialization operation to guarantee both type and initialization safety for well-behaved programs, as shown in column (d).

When loaded by a JVM adapted to add flush points in accordance with the present invention, the code appearing to the JIT compiler may be as shown in column (c). At step 624, the JIT compiler may also perform an inlining substep to inline code relating to the embedded constructor call, and add further flush points in accordance with the present invention, resulting in the code as shown in column (d). In performing one optimization, the escape analysis performed by the JIT compiler results in a determination that the newly created objects (temp and temp2) do not escape from their respective <init> calls for well-behaved programs. Accordingly, the JIT compiler can eliminate the flush points associated with the respective object creation operations, while leaving the flush point associated with the object initialization operation as shown in column (e). A further optimization is also possible, if it is determined that temp2 does not escape the executing thread between flush points flush3 and flush4. In that case, no other threads can know the existence of the newly created Low_level object until the newly created High_level object

EXAMPLE 2

```
class High_level {
    Low_level instanceObj;
    High_level ( )
    {
        instanceObj = new Low_level( );
    }
    ...
}
```

| a. Java statement => | b. compiled into .class file | c. .class loaded by JVM |
|---|---|---|
| oneObject = newHigh_level 0 | temp = new High_level;<br>High_level.<init>(temp);<br>oneObject = temp; | temp = new High_level;<br>flush1 ;<br>High_level.<init>(temp);<br>flush4;<br>oneObject = temp; | d. after inlining temp = new High_level;
flush1;
temp2 = new Low_level;
flush2;
Low-level.<init>(temp2);
flush3;
temp.instanceObj = temp2;
flush4;
oneObject = temp;

| e. after first optimization | f. after second optimization |
|---|---|
| temp = new High_level;<br>temp2 = new Low_level;<br>Low_level.<init>(temp2);<br>flush3;<br>temp.instanceObj = temp2;<br>flush4;<br>oneObject = temp; | temp = new High_level;<br>temp2 = new Low_level;<br>Low_level.<init>(temp2);<br>temp.instanceObj = temp2;<br>flush4;<br>oneObject = temp; |

Example 2 illustrates that a significant optimization opportunity arises when constructor calls are inlined. Assuming that the class High_level has been defined as shown, the statement shown in column (a), after compilation by a Java compiler into a class file, may appear to a JVM as shown in column (b).

itself is "published", and accordingly flush3 may also be eliminated as a further optimization as shown in column (f). It will be understood by persons skilled in the art that the numbering of the flush points in this example is provided for illustration purposes only.

EXAMPLE 3

```
class myclass {
    myclass(object something)
    {
        synchronized(something)
        {
            initializing...
        }
    }
}
```

| a. Java statement => | b. compiled into .class file | c. .class loaded by JVM |
|---|---|---|
| oneObject = new myclass(something) | temp = new myclass;<br>myclass.<init>(temp,something);<br>oneObject = temp; | temp = new myclass;<br>flush;<br>myclass.<init>(temp, something);<br>flush;<br>oneObject = temp; | d. after inlining temp = new myclass;
flush;
monitorEnter(something)
initializing ...
monitorExit(something)
flush;
oneObject = temp;

e. after first optimization temp = new myclass;
monitorEnter(something)
initializing...
monitorExit(something)
oneObject = temp;

Example 3 illustrates that an optimization opportunity arises in association with the presence of the monitorExit bytecode. Assuming that the class myclass has been defined as shown, the statement shown in column (a), after compilation by a Java compiler into a class file, may appear to a JVM as shown in column (b). When loaded by a JVM adapted to add flush points in accordance with the present invention, the code appearing to the JIT compiler may be as shown in column (c). At step 624, the JIT compiler may also perform an inlining substep to inline code relating to the embedded constructor call, and add further flush points in accordance with the present invention, resulting in the code as shown in column (d). In performing one optimization, the escape analysis performed by the JIT compiler results in a determination that the newly created object (temp) does not escape from its <init> call for well-behaved programs. Accordingly, the JIT compiler can eliminate the flush point associated with the object creation operation, while leaving the flush point associated with the object initialization operation. A further optimization is also possible if no other initializing modifications are made to temp between monitorExit and the remaining flush point. Since the monitorExit bytecode provides a natural flush point by definition according to the Java language specification, the remaining flush point is redundant and can also be eliminated. Accordingly, both inserted flush points initially added in accordance with the invention may be eliminated in this optimization step for well-behaved programs, as shown in column (e).

EXAMPLE 4

| a. Java statement => | b. .class loaded by JVM |
|---|---|
| //assume local variable has been<br>//defined as an instance of myclass<br>synchronized (something) {<br>    doing other things...<br>    local_variable = new myclass( );<br>} | monitorEnter(something);<br>doing other things...<br>temp = new myclass;<br>flush;<br>myclass.<init>(temp);<br>flush;<br>local_variable = temp;<br>monitorExit(something) | c. after optimization monitorEnter(something);
doing other things...
temp = new myclass;
myclass.<init>(temp);
local_variable = temp;
monitorExit(something)

Example 4 illustrates that an optimization opportunity may arise in association with the presence of the monitorExit bytecode, even if the monitorExit bytecode appears after a flush point. The statements shown in column (a), after compilation by a Java compiler into a class file, may appear to the JIT compiler after loading by a JVM adapted to add flush points in accordance with the present invention as shown in column (b). For well-behaved programs, not only can the flush point associated with the object creation operation be eliminated, but the remaining flush point might also be eliminated so long as the newly created object is not "published" between that flush point and monitorExit (as is shown in Example 4, since storing into a local variable is not "publishing" as no other threads can see local variables). Since the monitorExit bytecode provides a natural flush point by definition, the remaining flush point is redundant and can also be eliminated. Accordingly, both inserted flush points initially added may be eliminated in this optimization step for well-behaved programs, as shown in column (c).

It will be understood by persons skilled in the art from the examples provided herein, that for well-behaved programs, many opportunities to eliminate inserted flush points by inlining and redundancy analysis may be available. Generally, for well-behaved programs, inserted flush points associated with object creation operations initially added by the JVM may be subsequently eliminated in an optimizing step. Inserted flush points associated with object initialization operations added by the JVM may also be eliminated, leaving at least one of these flush points to maintain type and initialization safety in many cases.

For programs that are not well-behaved, while initialization safety may not be guaranteed, the inserted flush points associated with object creation operations added by the JVM cannot be eliminated, in order to maintain type safety.

While the present invention has been illustrated with regards to systems comprising a JIT compiler in an embodiment of the present invention, it will be understood by persons skilled in the art that the present invention may have application in other systems with a different type of compiler or in systems where only an interpreter is used.

While the present invention has been described in the context of a data processing system as a whole, it will be understood by persons skilled in the art that the methods of the present invention may also be embodied or distributed as instructions on computer-readable media, or communicated or distributed as instructions on transmission-type media.

Furthermore, while the depicted embodiments have been generally directed towards processing bytecodes in Java, the methods of the present invention may be applied to other programming languages and environments that process instructions, which are non-specific to a computer on which the instructions are to be executed. In such cases, a virtual machine on the computer may be used to interpret the instructions, and/or to send the instructions to a compiler to generate code suitable for execution by the computer on which the virtual machine is located.

The present invention has been described with regard to preferred and variant embodiments. However, it will be understood by persons skilled in the art that a number of other variants and modifications can be made without departing from the scope of the invention defined in the claims appended hereto.

What is claimed is:

1. A data processing system in which a plurality of bytecodes are executed, said data processing system comprising:
   a) a plurality of processors;
   b) a plurality of hardware resources coupled to said plurality of processors;
   c) an operating system coupled to said plurality of processors for allocating access to said plurality of hardware resources; and
   d) a virtual machine coupled to said plurality of processors, said virtual machine adapted to control performance of a method of executing bytecodes in said data processing system, said method comprising the steps of:
      receiving a plurality of bytecodes, said bytecodes comprising a subset of bytecode, said subset defining an operation involving an object, wherein said operation is involved in a creation of a new instance of the object in memory, and wherein the creation of the new instance of the object comprises at least two discrete data storage actions, wherein at least one of the at least two discrete data storage actions is a memory barrier operation;
      defining a portion of memory for storing data associated with an object;
      protecting the portion of memory with the memory barrier operation; and
      creating the new instance of the object in memory, wherein the creating of the new instance comprises executing the operation, wherein during the creating of the new instance, the memory barrier operation ensures at least one of type safety and initialization safety of the object.

2. The data processing system of claim 1, further comprising an interpreter coupled to said virtual machine adapted to protect the portion of memory using the memory barrier when creating the new instance of the object.

3. The data processing system of claim 2, said data processing system being further configured to prior to said executing the operation, generating a plurality of native instructions from one or more groups of bytecodes to be compiled from said plurality of bytecodes, wherein said generating step comprises the following substeps:
   i) for each bytecode in said one or more groups of bytecodes to be compiled identified as belonging to said subset, generating instructions in an intermediate format for performing the creation of the new instance of the object and for protecting the portion of memory using the memory barrier operation;
   ii) translating instructions in said intermediate format into said plurality of native instructions.

4. The data processing system of claim 1, wherein the memory barrier operation comprises a store barrier, wherein said store barrier forces a serialization of the at least two discrete data storage actions, which in absence of the store barrier are able to be reordered.

5. The data processing system of claim 1, wherein the at least two discrete data storage actions comprise a first action and a second action, said first action storing type information for the object in a hidden data area of the portion of memory, said second action storing an initialized value of the object in the portion of memory.

6. The data processing system of claim 1, wherein said data processing system is further configured to publish the new instance of the object only after both of the discrete data storage actions have completed, wherein publishing the new instance causes threads other than the one creating the new instance to be aware of the objects existence.

7. The data processing system of claim 1, wherein a programming language for the data processing system comprises a language command for creating new instances of an object, wherein when said language command is converted into bytecode, at least two different opcodes result, wherein one of said opcodes comprises an object creation operation and an object initialization operation, wherein said operation is at least one of the object creation operation and the object initialization operation.

8. The data processing system of claim 1, wherein the object creation operation allocates the portion of memory and adds hidden data comprising type information for the object to the allocated portion of memory, and wherein the object initialization operation comprises calling a constructor class to initialize an object and to store a value for the initialized object in the allocated portion of memory.

9. The data processing system of claim 1, wherein said operation is associated with an opcode of invokespecial, said method further comprising:
replacing the invokespecial opcode with an opcode for invokespecial_and_flush, wherein execution of the invokespecial_and_flush opcode results in an establishment of the memory barrier and an execution of the operation.

10. A data processing virtual machine stored in a memory for use in a data processing system, wherein said virtual machine is specified by a plurality of programmatic instructions digitally encoded on computer-readable medium, wherein said programmatic instructions are configured to be executed by at least one machine, wherein said virtual machine is configured to execute a set of bytecodes digitally coded upon a computer-readable medium, wherein said bytecodes when executed within the virtual machine cause the at least one machine in said data processing system to perform a set of programmatic actions, said programmatic actions comprising:
receiving a plurality of bytecodes, said bytecodes comprising a subset of bytecode, said subset defining an operation involving an object, wherein said operation is involved in a creation of a new instance of the object in memory, and wherein the creation of the new instance of the object comprises at least two discrete data storage actions, wherein at least one of the at least two discrete data storage actions is a memory barrier operation;
defining a portion of memory for storing data associated with an object;
protecting the portion of memory with the memory barrier operation; and
creating the new instance of the object in memory, wherein the creating of the new instance comprises executing the operation, wherein during the creating of the new instance, the memory barrier operation ensures at least one of type safety and initialization safety of the object.

11. A just-in-time compiler stored in a memory in a data processing system, wherein said compiler is coupled to a virtual machine stored in another memory adapted to control performance of a method of executing bytecodes in said data processing system, said method comprising the steps of:
receiving a plurality of bytecodes, said bytecodes comprising a subset of bytecode, said subset defining an operation involving an object, wherein said operation is involved in a creation of a new instance of the object in memory, and wherein the creation of the new instance of the object comprises at least two discrete data storage actions, wherein at least one of the at least two discrete data storage actions is a memory barrier operation;
defining a portion of memory for storing data associated with an object;
protecting the portion of memory with the memory barrier operation;
creating the new instance of the object in memory, wherein the creating of the new instance comprises executing the operation, wherein during the creating of the new instance, the memory barrier operation ensures at least one of type safety and initialization safety of the object; and
prior to executing the operation, generating a plurality of native instructions from one or more groups of bytecodes to be compiled from said plurality of bytecodes, wherein said generating step comprises the following substeps:
i) for each bytecode in said one or more groups of bytecodes to be compiled identified as belonging to said subset, generating instructions in an intermediate format for performing the creation of the new instance of the object and for protecting the portion of memory using the memory barrier operation;
ii) translating instructions in said intermediate format into said plurality of native instructions.

12. The compiler of claim 11, wherein said generating step further includes an optimizing substep preceding said translating substep, wherein one or more optimizations are performed at said optimizing substep, such that at least one instruction for performing a memory barrier operation is eliminated from said instructions to be translated at said translating substep.

13. The compiler of claim 12, wherein said optimizing substep further comprises applying an escape analysis to each of said one or more groups of bytecodes to be compiled.

14. A non-transitory computer-readable medium upon which a set of machine-readable instructions are digitally encoded that when executed by a machine enable the machine to perform a set of programmatic actions for a bytecode based data processing system, said programmatic actions comprising the steps of:
receiving a plurality of bytecodes, said bytecodes comprising a subset of bytecode, said subset defining an operation involving an object, wherein said operation is involved in a creation of a new instance of the object in memory, and wherein the creation of the new instance of the object comprises at least two discrete data storage actions, wherein at least one of the at least two discrete data storage actions is a memory barrier operation;
defining a portion of memory for storing data associated with an object;
protecting the portion of memory with the memory barrier operation; and
creating the new instance of the object in memory, wherein the creating of the new instance comprises executing the operation, wherein during the creating of the new instance, the memory barrier operation ensures at least one of type safety and initialization safety of the object.

* * * * *